UNITED STATES PATENT OFFICE.

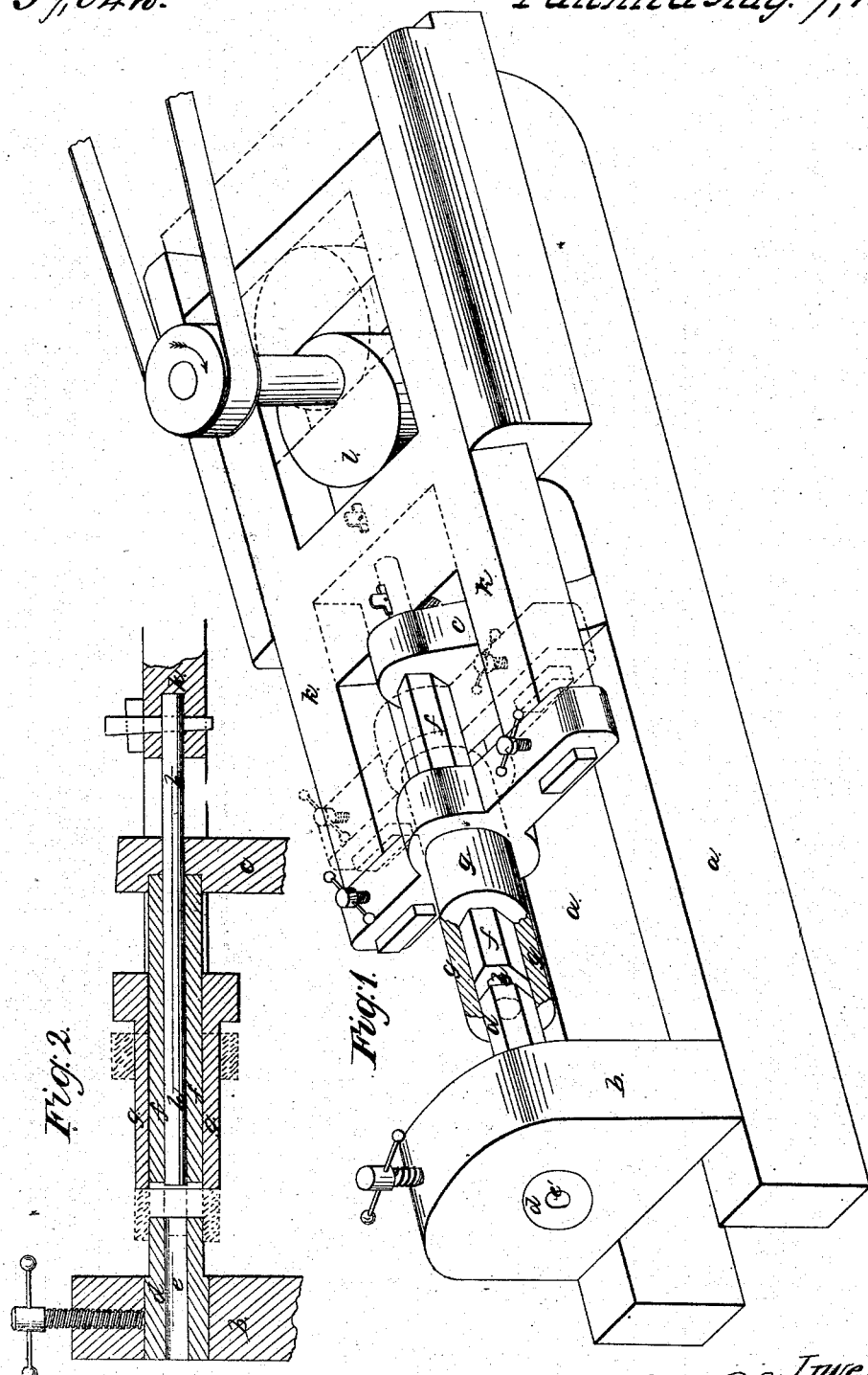

CHARLES P. GEISSENHAINER, OF PITTSBURG, PENNSYLVANIA, ASSIGNOR TO HIMSELF AND JOSEPH GRAFF, OF SAME PLACE.

IMPROVEMENT IN MACHINES FOR MAKING NUTS AND WASHERS.

Specification forming part of Letters Patent No. 57,042, dated August 7, 1866.

*To all whom it may concern:*

Be it known that I, CHARLES P. GEISSENHAINER, of the city of Pittsburg, in the county of Allegheny and State of Pennsylvania, have invented a new and useful Improvement in Machines for Making Nuts and Washers; and I do hereby declare the following to be a full, clear, and exact description thereof, reference being had to the accompanying drawings, forming part of this specification, in which—

Figure 1 is a perspective representation of my improved machine. Fig. 2 is a longitudinal section through the dies, sleeve-box, and punch.

In both figures like letters are employed to denote similar parts.

My machine is designed to make nuts or washers of iron by cutting and punching a blank to form a nut without compression of the blank within the die-box.

In the drawings, $a\ a$ is the frame-work of the machine, having two cross-heads, $b$ and $c$, firmly secured to the frame.

The die $d$, against the face of which the nut or washer is cut off and punched, is a block of iron or steel of equal diameter throughout, and of such exterior shape and diameter as the nut or washer to be made thereby. It is also perforated from end to end by a cylindrical hole, $e$, of the size of the eye of the nut or washer. This die $d$ is set horizontally in the cross-head $b$ at the front end of the machine, and secured thereto by set-screws, so as to be adjusted in position, and, when necessary, replaced by another die of different diameter or shape, so as to make other descriptions of nuts or washers.

The die $d$ passes through the cross-head $b$, so that the burr or wad cut from the eye of the nut may be discharged at $e'$. In the same horizontal line with the die $d$ is placed the counter-die $f$, which is of the same shape and diameter as the die $d$, and, like it, perforated from end to end by a cylindrical hole, in which the round punch $h$ is situate. The counter-die $f$ is firmly attached to the cross-head $c$, with its face opposite to and parallel with the face of the die $d$, the distance between the opposite faces of the die $d$ and counter-die $f$ being a little greater than the thickness of the bar from which the nut is to be cut.

The die $d$ and counter-die $f$ do not change their relative position nor move at all during the operation of the machine.

The round punch $h$, which works inside of the cavity of the counter-die $f$, is attached to the sliding frame $k$. The sliding frame has a reciprocating motion lengthwise of the machine, which motion is effected by the revolving cam $l$, working in a yoke at the rear end of the sliding frame $k$.

Attached to the front end of the frame $k$, so as to slide back and forth with it, is the sleeve or hollow die $g$, which is a hollow cylinder, the cavity of which is the exact counterpart of the counter-die $f$ and die $d$. This hollow die is placed on the counter-die $f$ so as to slide upon it, while the counter-die $f$ is stationary.

In Fig. 1 the sleeve $g$ is represented as projecting so far as to cover the space between the faces of the die $d$ and counter-die $f$, and extending over onto the die $d$, a portion of one side of the sleeve being represented as broken off, so as to show the position of the other parts.

As the sleeve $g$ and round punch $h$ are both attached to and move with the sliding frame $k$, they always preserve the same relative position; and it is an important feature of my machine that the forward end of the round punch $h$ and face of the hollow die or sleeve $g$ are not exactly in the same vertical plane, the object of which is that (although the punching and cutting of the nut are done simultaneously) the punch and sleeve may not begin to operate on the iron to form the nut at the same time, but one a little before the other, which has the effect of relieving the strain on those parts.

In my machine the point or extremity of the round punch $h$ lies a little back of the face of the hollow die or sleeve $g$, and so continues during the entire operation.

Having thus described my machine, I will explain the mode of its operation.

When the sleeve $g$ and punch $h$ (which are the only operative parts that change their position in making a nut) are drawn back, as in Fig. 2, a bar of iron from which the nut is to be made is fed in between the die $d$ and counter-die $f$, resting against the face of the die $d$. The sleeve $g$ and round punch $h$ then advance and press against the iron bar. As the punch is a little back of the face of sleeve $g$, the iron begins to enter the cavity of the sleeve before it reaches the end of the punch; but as the sleeve and punch are still farther advanced the sleeve cuts off the nut against the face of the die $d$ and passes over the nut or receives it in its cavity, while at the same time the punch passes through the nut, forcing the burr or wad from the eye of the nut into the bore $e$ of the die $d$. The sleeve $g$ and punch $h$ are then in the position shown in Fig. 1 and by dotted lines in Fig. 2, and the nut is ready to be delivered from the machine. This is effected by the backward motion of the sleeve $g$ and punch $h$, which, in resuming their first position, bring the nut against the face of the counter-die $f$, by which the nut is held still while the sleeve and punch withdraw from it, and the nut then drops away from the machine.

What I claim as my invention is—

The combination of the stationary dies $d$ and $f$ with the hollow die or sleeve $g$ and punch $h$, which move together, arranged and operating for the manufacture of nuts, substantially in the manner hereinbefore described.

In testimony whereof I, the said CHARLES P. GEISSENHAINER, have hereunto set my hand.

CHARLES P. GEISSENHAINER.

Witnesses:
ALLAN C. BAKEWELL,
A. S. NICHOLSON.